Oct. 25, 1949.    S. Q. ZIMMERMAN    2,485,951
INTERNAL-COMBUSTION ENGINE
Filed Aug. 16, 1946    2 Sheets-Sheet 1
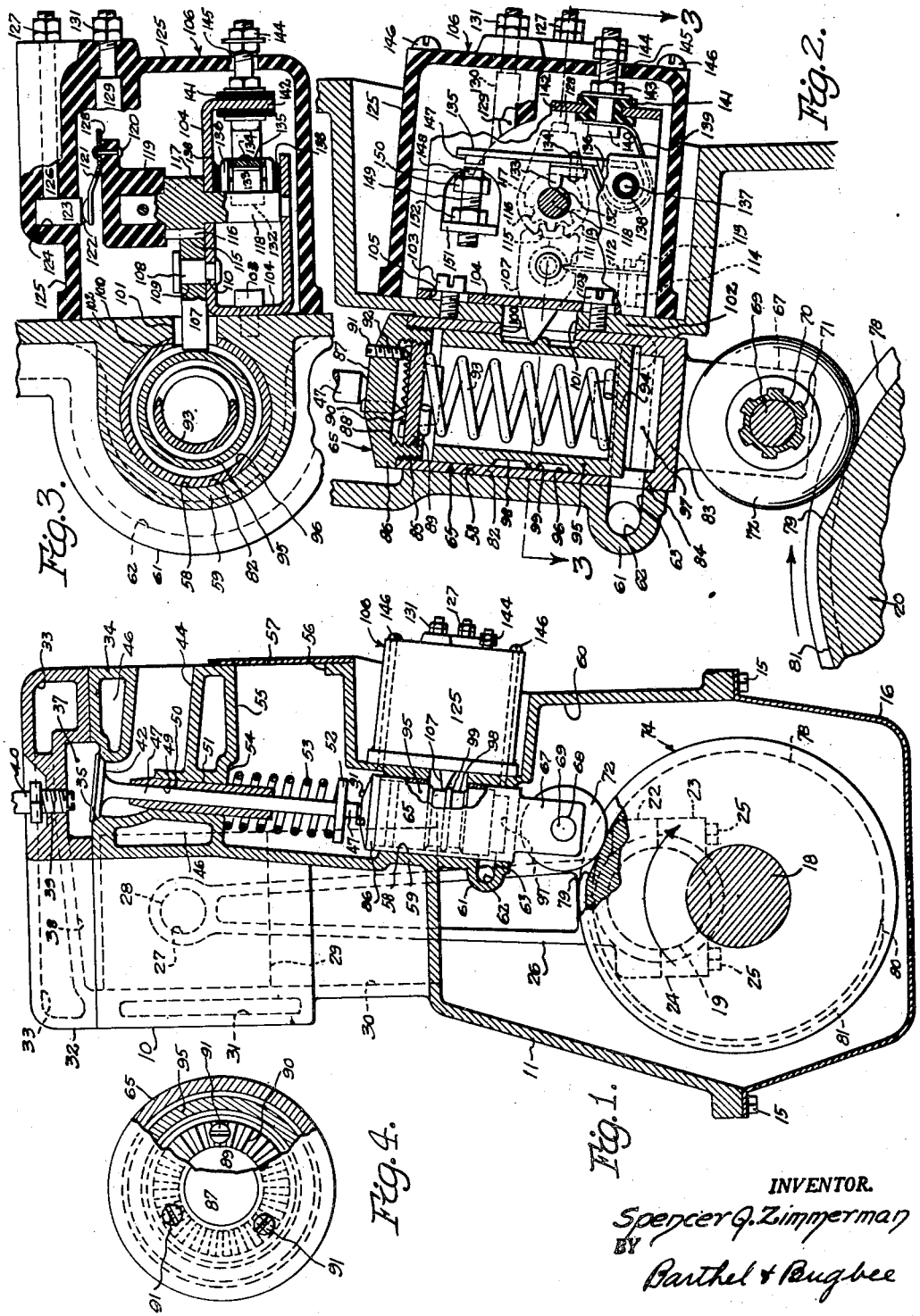
INVENTOR.
Spencer Q. Zimmerman
BY
Barthel & Bugbee
ATTYS Oct. 25, 1949.     S. Q. ZIMMERMAN     2,485,951
INTERNAL-COMBUSTION ENGINE
Filed Aug. 16, 1946     2 Sheets-Sheet 2
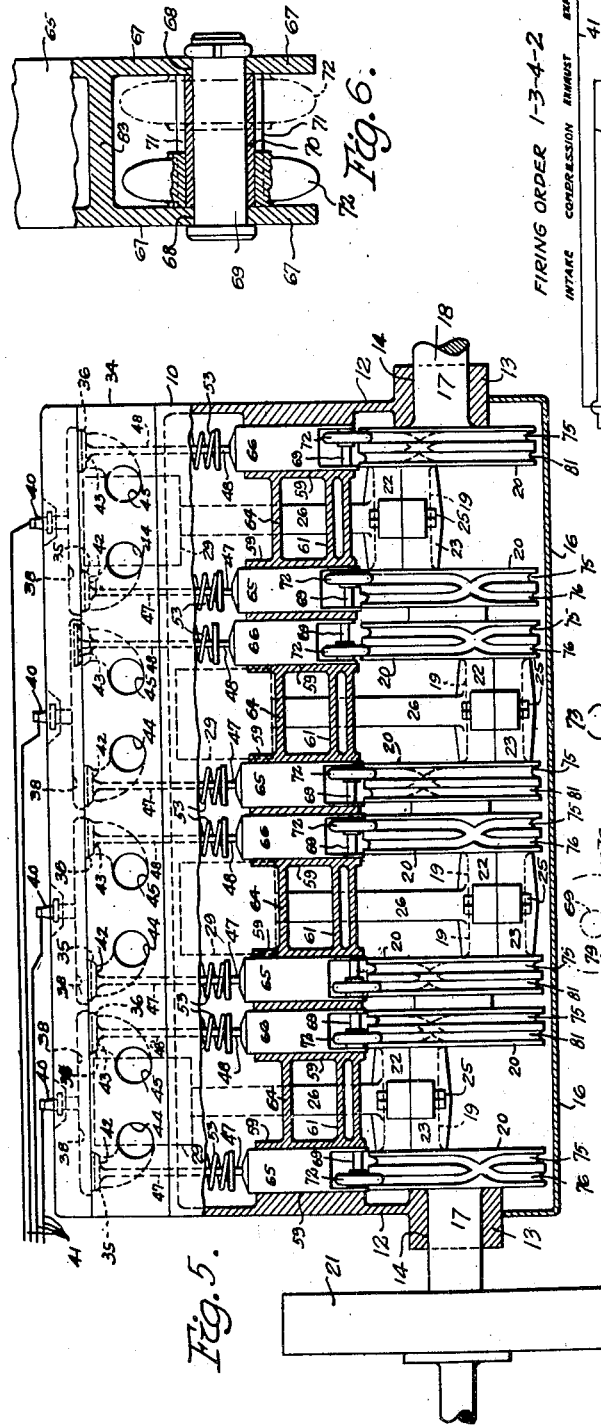
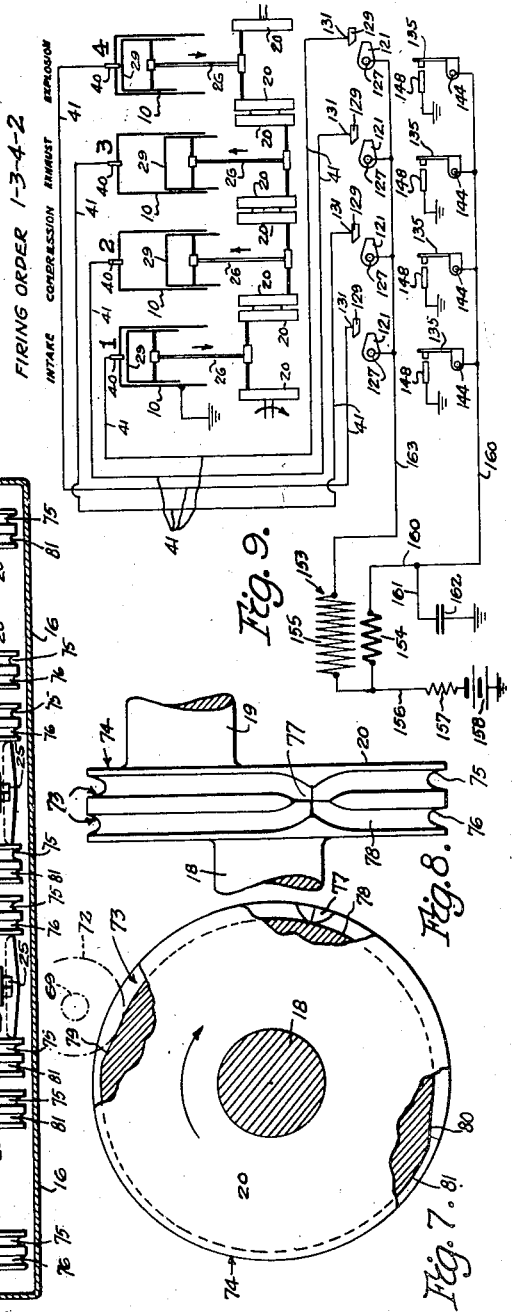
INVENTOR.
Spencer Q. Zimmerman.
BY
Barthel & Bugbee
ATTYS Patented Oct. 25, 1949

2,485,951

UNITED STATES PATENT OFFICE 2,485,951

INTERNAL-COMBUSTION ENGINE

Spencer Q. Zimmerman, Detroit, Mich.

Application August 16, 1946, Serial No. 690,967

7 Claims. (Cl. 123—146.5)

This invention relates to internal combustion engines, and in particular to valve operating and ignition timing mechanism for four cycle engines.

One object of this invention is to provide a valve operating mechanism for an internal combustion engine wherein the valve is operated by a novel cam which is mounted directly on the engine crankshaft and which therefore eliminates the conventional cam shaft and cam shaft gears entirely.

Another object is to provide a valve operating mechanism, as set forth in the preceding objects, wherein the cam structure is mounted upon the crankshaft cheeks, thereby providing a much simpler engine with fewer moving parts.

Another object is to provide a valve operating mechanism, as set forth in the preceding objects, wherein the cam is provided with two grooved cam paths with a cross-over portion between them, these being traversed by an axially movable roller, this mechanism providing a longer full opening of the intake and exhaust valves than hitherto, hence producing more power for an engine of a given piston displacement.

Another object is to provide an ignition timing mechanism associated with the valve operating mechanism set forth in the preceding objects, wherein the motion of the valve tappet in response to the travel of the roller in the double cam track actuates the ignition timing for another cylinder, and wherein the ignition timing mechanism may be associated either with an intake valve tappet or an exhaust valve tappet.

Another object is to provide an ignition timing mechanism, as set forth in the object immediately preceding, wherein the valve tappet includes mechanism responsive to the increase of engine speed to automatically advance the timing of the ignition timing mechanism.

Another object is to provide an ignition timing mechanism, as set forth in the two preceding objects, wherein the valve tappet includes a resiliently pressed plunger for operating the ignition timing mechanism, this plunger being movable relatively to the valve tappet itself, in response to the increase of pressure in the lubrication system resulting from an increase in speed of the engine.

Another object is to provide an ignition timing mechanism, as set forth in the preceding objects, wherein the valve tappet is provided with a spring-pressed internal plunger having means associated therewith for the adjustment of the spring force applied to the plunger, in order to compensate for the different pressures existing at the different internal plungers, which are located at different points in the lubrication system.

Other objects and advantages of the invention will become apparent during the course of the following description of the accompanying drawings, wherein:

Figure 1 is a vertical cross-section, taken in the plane of the valve rod axis through an engine according to a preferred form of the invention;

Figure 2 is an enlarged fragmentary section through the axis of the valve tappet and showing the arrangement of the valve tappet and ignition timing mechanism associated therewith, as shown in the middle portion of Figure 1;

Figure 3 is an approximately horizontal section along the line 3—3 in Figure 2;

Figure 4 is a top plan view of the valve tappet and its associated structure, shown in Figure 2, partly broken away to disclose the spring pressure adjusting mechanism;

Figure 5 is a side elevation of the major portion of the internal combustion engine shown in Figure 1, partly in section through the plane of the axis of the valve tappet, showing the mechanism for operating the valve tappets;

Figure 6 is an enlarged fragmentary side elevation of the cam roller or follower and the lower end of the valve tappet shown in Figure 5, partly in section through the axis of the cam roller shaft;

Figure 7 is an end elevation of the double-tracked cam structure of the engine shown in Figures 1 to 6 inclusive, with certain portions broken away to disclose the transition parts of the cam tracks;

Figure 8 is a side elevation of the cam structure shown in Figure 7; and

Figure 9 is a schematic wiring diagram of an ignition timing circuit capable of use with the engine and parts thereof shown in Figures 1 to 8 inclusive.

General engine construction

Referring to the drawings in detail, Figures 1 and 5 show a preferred form of the engine of the four-cycle type according to the invention as including a cylinder block 10 having a crankcase portion 11 shown as cast integral therewith but capable of being cast separately, if desired, according to well-known engine building practice. The crankcase portion 11 is provided with downwardly extending end walls 12 having bearings bosses 13 with bearing bores 14 therein. Secured as at 15 to the lower edge of the crankcase portion 11 (Figure 1) is a sump 16 forming a closure for the crankcase portion 11. Rotatably mounted in the bearing bores 14 are the end portions 17 of a crankshaft 18 having offset crank pins 19 between disc-like crank webs or cheeks 20. Mounted on one end of the crankshaft 18 is a flywheel 21.

Engaging the crank pins 19 are the upper and lower halves 22 and 23 of connecting rod bearing members 24 held together by bolts 25 and forming the lower portions of connecting rods 26. The upper ends of the connecting rods 26 are provided with transverse bores 27 serving to receive wrist pins 28, the outer ends of which are seated in pistons 29 in a conventional manner, the details of which form no part of the present invention. The pistons 29 are reciprocable in cylinder bores 30 in the cylinder block 10 and the cylinder bores 30 are surrounded by water jackets or liquid cooling passageways 31. Secured to the upper end of the cylinder block 10 is a cylinder head 32 having the usual liquid cooling passageways 33 connected to the water jacket 31 for the circulation of a cooling liquid, such as water, in a conventional cooling system, such as includes the usual pump and radiator (not shown). Conventional air cooling may also be used.

Cast integral with the cylinder block 10 and offset laterally therein is a valve chest portion 34 having paired poppet valve seats 35 and 36 opening into ante-chambers 37 which communicate with explosion chambers 38 formed in the cylinder head 32 at the upper ends of the cylinder bores 30. Opening into the ante-chambers 37 are threaded bores 39 adapted to receive the correspondingly threaded ends of conventional spark plugs 40 to which are connected conductor cables 41 leading to an ignition system, subsequently to be described.

Seated respectively in the valve seats 35 and 36 are poppet intake and exhaust valves 42 and 43 adapted to open and close communication with intake and exhaust passageways 44 and 45 respectively in the valve chest portion 34. The intake passageways 44 are connected to a conventional intake manifold and carburetor (not shown) which in turn is connected to a conventional source of fuel, such as a gasoline tank (not shown).

The passageways 44 and 45 are surrounded by coolant passageways 46 communicating with the water jackets 31 and passageways 33 for the circulation of the coolant liquid, such as water. The valves 42 and 43 are provided with downwardly extending valve rods 47 and 48 respectively passing through and reciprocably mounted in bores 49 in tubular members 50 which in turn are seated in bores 51 inclined slightly to the vertical and formed in the valve chest portion 34 (Figure 1). The lower ends of the valve rods 47 and 48 are provided with enlargements 52 serving as abutments for the lower ends of helical valve springs 53, the upper ends of which engage the abutment portions 54 surrounding the lower ends of the bores 51 within a chamber 55 also formed in the valve chest portion 34 and having outlets 56 closed by a closure plate 57.

*Valve operating mechanism*

Opening downwardly from the chamber 55 are vertically inclined valve tappet bores 58 formed in the hollow portions 59 extending downwardly into the crankcase chamber 60 enclosed by the crankcase portion 11 and sump 16. The portions 59 near their lower ends are provided with bosses 61 containing lubricant passageways 62 having ports 63 opening into the valve tappet bores 58. The passageways 62 are connected to the conventional force-feed lubrication system of the engine (not shown) so as to receive a part of the lubricant supplied thereto under pressure by a conventional lubricant pump (not shown). The portions 59 containing the valve tappet bores 58 are interconnected by webs 64 (Figure 5) so as to strengthen them and maintain them in alignment.

Reciprocably mounted in the valve tappet bores 58 and engaged by the valve rods 47 and 48 are intake and exhaust valve tappet units generally designated 65 and 66 respectively, one of each pair of which is provided with the internal piston and ignition timing mechanism described below. The lower ends of the valve tappet units 65 and 66 are provided with downwardly extending arms 67 containing aligned transverse bores 68 (Figures 1 and 6) in which are mounted axles 69 carrying sleeves 70 with splines 71. Slidably mounted on the sleeves 70 and splines 71 (Figures 2 and 6) are cam followers or rollers 72, the rounded peripheries of which engage and travel in a double grooveway system 73 in the periphery of each crank cheek 20. The circular crank cheeks 20 and their grooveway systems 73 combine to form cam units, generally designated 74 (Figures 7 and 8).

Each grooveway system 73 consists of right and lefthand portions 75 and 76 respectively communicating with one another at cross-overs 77 such that the rollers 72 will travel axially along the sleeves 70 when they reach the cross-overs 77 (Figure 8). The side walls of the grooves 75 and 76 at the cross-overs 77 join one another in X-shaped formations for facilitating the travel of the rollers 72 both rotationally and axially. The right-hand groove 75 is substantially circular in a plane perpendicular to the axis of the crankshaft 18 (Figures 7 and 8) and has its center coincident with the said axis. The left-hand groove 76 is likewise provided with an arcuate portion 78 of the same center and radius of curvature as the groove 75, the portions 75 and 78 forming a low dwell grooveway in which the cam roller 72 rests while the valves 42 and 43 are in their closed positions engaging the valve seats 35 and 36.

Beyond the low dwell arcuate portion 78 of the left-hand groove 76, the latter is provided with outwardly inclined portions 79 and 80 leading to an arcuate high dwell portion 81 having a longer curvature than the low dwell portions 75 and 78 but likewise centered on the axis of rotation of the crankshaft 18. The high dwell portion 81 in combination with the inclined portions 79 and 80 causes each cam roller 72 to ride up the inclined portion 79 from the low dwell portion 78 to the high dwell portion 81, lifting the valve tappet units 65 or 66, as the case may be, and therefore opening the intake or exhaust valves 42 or 43. The valve remains open as long as the roller 72 traverses the high dwell portion 81 and again closes when the roller 72 rides down the inclined portion 81 into the low dwell portion 78 as the crankshaft 18 rotates in the direction of the arrow (Figure 7).

Each time that the roller 72 reaches the cross-over 77 it passes either from the right-hand groove 75 to the left-hand groove 76 or vice versa, so that the roller 72 alternately travels in the grooves 75 and 76 and permits the valve 42 or 43 to be held closed for approximately one and one-half revolutions of the crankshaft 18 and then holds the valve 42 or 43 open for approximately a half revolution while the roller 72 traverses the high dwell portion 81 of the grooveway system 73. The arcuate extent of the high dwell portion 81 is proportioned according to the length of time it is desired for each valve 42 or 43 to remain open during the operating cycle of the engine.

Ignition timing mechanism

Each valve tappet unit 65 (Figures 2 and 3) is hollow and consists of a sleeve-like portion 82 reciprocably mounted in the bores 58 and closed at its lower portion by an end wall 83 near which is a port 84 communicating with the port 63 in all positions of the valve tappet unit 65. The upper end of the portion 82 is internally threaded as at 85 to receive the correspondingly threaded portion of a hollow cap 86 closing the upper end thereof and having a flattened central portion 87 for engagement by the lower end of the valve rod 47 or 48. The hollow cap 86 is provided with an internally threaded recess 88 adapted to receive a correspondingly threaded abutment disc 89 having radial teeth 90 arranged in an annular path (Figures 2 and 4) and adapted to be engaged by the pointed inner ends of set screws 91 threaded through holes 92 in the cap 86.

The set screws 91 serve as retaining screws for holding the abutment disc 89 in its position of adjustment. This adjustment is changed by removing one of the screws 91 and inserting a pointed rod of smaller diameter than the screw holes 92 therethrough into engagement with the teeth 90, working the rod in one direction or the other in order to rotate the abutment disc 89 so as to screw it up or down within the threaded recess 88, after which the rod is removed and the set screws 91 screwed downward to again engage the teeth 90 and hold the abutment disc 89 in its adjusted position.

Engaging the abutment disc 89 is the upper end of a helical spring 93 (Figure 2), the lower end of which engages the inside surface of the end wall 94 of a hollow cup-like piston 95 which is reciprocably mounted within a bore 96 co-axial with the bore 58. The bore 96 at its lower end opens into a chamber 97 which in turn communicates with the lubricant passageway 62 by way of the ports 84 and 63 (Figure 2). Thus the end 94 of the hollow piston 95 is constantly engaged by pressure fluid, namely the lubricating oil in the chamber 97, so that the hollow piston 95 rises or falls in its bore 96 as the oil pressure in the lubrication system rises or falls.

The central portion of the hollow piston 95 is provided with an annular peripheral groove 98 which has an outwardly projecting annular ridge 99. The sleeve-like portion 82 of the valve tappet unit 65 is provided with an elongated aperture 100 (Figure 2) communicating with a corresponding aperture 101 in the side wall portion 102 of the crankcase portion 11 (Figure 2) which lies adjacent the valve tappet bore 58.

Secured as by the screws 103 to the side wall portion 102 is a U-shaped frame 104 having vertical adjusting slots 105 therein through which the screws 103 pass. By loosening the screws 103, the frame 104 may be moved up or down and locked in its new position by retightening the screws 103. This adjustment is provided for the purpose of adjusting the timing of an ignition timing device, generally designated 106 by moving the tip of a lever 107 relatively to the ridge 99 on the hollow piston 95, so as to vary the point at which engagement of the ridge 99 with the lever 107 will occur. The tip of the lever 107 extends through the apertures 101 and 100 into a position where it can be engaged by the ridge 99 as the valve tappet unit 65 moves up and down in response to the rotation of the cam unit 74 which its cam roller 72 engages.

The lever 107 is pivotally mounted on a pivot stud 108 passing through a bore 109 therein and anchored as at 110 in the frame 104. The bottom edge of the lever 107 is provided with a notch 111 (Figure 2) engaged by the upper end of a leaf-spring 112 secured to the U-shaped frame 104 by the screw 113 and spacing member 114. The leaf spring 112 is relatively stiff and maintains the lever 107 in an intermediate position from which it can rock up or down in either direction. The opposite end of the lever 107 is provided with gear teeth 115 arranged in the form of a quadrant and meshing with gear teeth 116 upon an enlargement 117 on a shaft 118 journaled in the opposite sides of the U-shaped frame 104 (Figure 3). One end of the shaft 118 carries a cap 119 of insulating material to which is secured as at 120 a distributor arm 121, the inner end of which carries a button 122 co-axial with the shaft 118. The button 122 engages a contact member 123 mounted in a socket 124 in the side walls of a casing 125 of insulating material which encloses the ignition timing device 106. The contact member 123 in turn is connected to a conductor 126 passing through the casing 125 and threaded at its outer end to receive nuts forming a terminal 127.

The opposite end 128 of the arm 121 forms one electrode of a spark gap, the opposite electrode 129 of which (Figure 2) has an arcuate inner end centered on the axis of the shaft 118 and spaced away from the electrode 128 a short distance sufficient to permit a spark to jump across when the circuit is properly connected and closed. The electrode 129 is seated in a bore 130 in the casing 125 and its outer end is threaded to receive nuts forming a terminal 131.

The shaft 118 near its inner end is provided with a flat portion 132 (Figure 2) engaged by a contact finger 133 secured as at 134 to the intermediate portion of a timer arm 135 having parallel wing portions 136 near its lower end pivotally mounted upon a pivot pin 137 seated in the opposite walls of the U-shaped frame 104 and separated therefrom by insulation 138. The finger 133 is of insulating material but an electrical connection is made with the arm 135 by an approximately U-shaped leaf spring 139 (Figure 2), the upper end of which is secured to the arm 135 by the same fastener 134 which secures the finger 133 thereto. The U-shaped spring 139 partially encircles the pivot pin 137 and its associated parts in spaced relationship and its opposite end is secured to the inner end of a conductor 140 passing through an insulating collar 141 mounted in the bent portion 142 forming a part of the U-shaped frame 104 and passing therethrough.

The outer end of the conductor 140, which is in the form of a screw, is threaded to receive a retaining nut 143 by which the parts are held in assembly on the bent frame portion 142 which serves as a bracket. The extreme outer end of a conductor 140 is provided with nuts 144 forming a terminal for the connection of wiring or cables which are also connected to the terminals 127 and 131 in the manner explained below. The conductor 140 passes outward through a hole 145 in the casing 125 in spaced relationship thereto and the casing 125 itself is secured to the side wall portion 102 by screws 146 which may be removed to remove the casing 125 and provide access to the parts housed by it.

Mounted on the upper end of the arm 135 is a contact member 147 which is adapted to engage and close the circuit with an opposing contact member 148 (Figure 2) mounted on an adjusting screw 149 having a head 150 by which the screw 149 may be rotated. The opposite end of the screw 149 is threaded into an arm 151 struck out of the frame 104 at right angles thereto. A lock nut 152 is provided for holding the screw 149 in its adjusted position in the arm 151. Since the frame 104 is connected to the engine through the screws 103 in direct engagement with the wall portion 102, the contact member 148 is thereby grounded and thus electrically connected to other portions of the electrical ignition circuit which are also grounded, as explained below.

The ignition timing mechanism shown in the central portion of Figure 1 and in detail in Figures 2, 3 and 4 may be associated with either the intake valve tappet units 65 or the exhaust valve tappet units 66. For purposes of illustration, the mechanism has been shown as associated with the intake valve tappet units 65. The engine is provided with as many of the ignition timing devices 106 as it has cylinders, four being required for the four-cylinder engine disclosed herein by way of exemplifying the invention. It is to be emphasized, however, that the timing device 106 actuated by the valve tappet units 65 or 66 is not used to time the ignition of that particular cylinder but, on the contrary, is used to time the ignition of a different cylinder, the piston of which is at the top of its compression stroke, as is clearly shown in Figure 9. This is evident from a consideration of Figure 1 which shows that the ignition timing device 106 is operated when the valve to which it is connected moves upward to open. Obviously, the ignition timing is arranged so that the spark occurs at the electrodes of the spark plug 40 in a given cylinder only when the intake and exhaust valves 42 and 43 of that cylinder are closed against their valve seats 35 and 36 respectively.

Ignition system

The ignition system of which the ignition timing device 106 is a part may be of any conventional type, the details of which form no part of the present invention. A typical make-and-break ignition system for a four-cylinder engine according to the present invention is shown in Figure 9 and contains a high tension ignition coil 153 having a primary winding 154 and a secondary winding 155. The primary winding 154 is connected through the line 156 containing a resistor 157, to one pole of a source of low-tension electricity, such as a storage battery 158, the opposite pole of which is grounded to the chassis of the vehicle or to the engine directly or indirectly in any other suitable way. The opposite end of the primary winding 154 is connected by the line 160 to the terminals 144 of the timer arms 135 with their contacts 147. The opposing contacts 148 are grounded to the engine, as previously explained.

A branch line 161 containing a condenser 162 runs to a ground connection with the chassis or engine. This enables the secondary winding 155 of the coil 153 to be grounded without correspondingly grounding the primary coil 154, since the low-tension direct current passing through the primary coil 154 is stopped by the condenser 162, whereas the high tension alternating current induced in the secondary winding 155 passes freely through the condenser 162 to the ground by way of the primary winding 154 and lines 160 and 161. The opposite end of the secondary winding 155 is connected by the line 163 to the terminals 127 connected to the distributor arms 121 by the engagement of the button portion 122 with the electrodes 123. The terminals 131 of the opposing electrodes 129 are connected by the previously mentioned lines 41 to the insulated central electrode of the spark plug 40, the opposite electrodes thereof being of course grounded to the engine in the usual manner, or otherwise connected back to the battery.

Operation

In operation, the engine is started in the conventional manner by rotating the flywheel 21 and crankshaft 18, causing the cam units 74 to rotate as the connecting rods 26 and pistons 29 move up and down. As the cam units 74 rotate, their grooved portions 75 and 76 pass under the respective roller 72 and this turns slightly as it approaches the cross-over 77 to pass from one groove to the other. The cam roller 72 does not rise so long as it traverses the entire groove 75 and the low level portion 78 of the groove 76, hence the valve tappet unit 69 remains stationary for approximately one and one half revolutions. When the cam roller 72 moves up the inclined portion 79 (Figure 7), to the high level or high dwell grooved portion 81, the tappet unit 65 moves upward, pushing the valve rod 47 upward and raising the intake or exhaust valve 42 or 43 from its seat 35 or 36, depending upon which valve is under consideration. The valve remains open so long as a part of the high dwell groove portion 81 is passing under the cam roller 72. During this time, therefore, the valve is open so that a charge of fuel gas is drawn in while the piston descends, if the valve is an intake valve 42, or else the valve remains open as the piston ascends to expel the products of combustion if the valve is an exhaust valve 43.

As the valve tappet unit 65 rises and the engine has just started, the oil pressure in the passageway 62 has not yet risen a sufficient amount to raise the hollow piston 95 against the thrust of the coil spring 93, hence the piston 95 is at its lowermost position and the ignition device 106 will give a retarded spark timing. This occurs when the valve tappet unit 65 rises, carrying with it the hollow piston 95 and causing the annular ridge 99 to pass the tip of the lever 107, tripping the lever 107 and rotating its teeth 115 in a clockwise direction and consequently rotating the shaft 118 (Figure 2) in a counterclockwise direction.

As the shaft 118 continues to rotate in a counterclockwise direction from the position shown in Figure 2, the flat spot 132 engages the finger 133, permitting the arm 135 to swing to the left under the influence of the spring tension of the conductor 139, causing the contacts 147 and 148 to engage and closing the circuit between the battery 158 and the primary winding 154 of the coil 153. Meanwhile, the arm 121 and its electrode 128 swing upward past the arcuate end of the electrode 129. When the ridge 99 releases the lever 107, the latter swings back to its normal position under the influence of the leaf spring 112, thereby rotating the shaft 118 in a counterclockwise direction and causing the finger 133 to move off the flat portion 132, breaking the contact between the electrodes 147 and 148. When this occurs, a high tension current is induced in the secondary winding 155 of the coil 153 just as the electrode 128 on the arm 121 is swinging downward past the arcuate end of the electrode 129. As a consequence, a spark jumps between the electrodes 128 and 129, and the high tension electricity of which the spark is visible evidence passes along one of the lines 41 to the spark plug 40 to which it is connected in another cylinder (Figure 9) and jumps the gap between the spark plug electrodes to the ground connection with the engine, igniting the compressed fuel gas charge within the chamber 37 and causing the remainder of the fuel gas to be ignited in the chamber 38.

The resulting explosion drives the piston 29 downward, causing a power stroke to be exerted through the connecting rod 26 to the crankpin 19 of the crankshaft 18 as the piston 29 descends. Meanwhile, the cam rollers 72 are traversing the low level dwell portions of the double grooveway system 73 in the cylinder in which the explosion is taking place, so that the valve tappet units 65 and 66 remain in their lowest position with the intake and exhaust valves 42 and 43 closed. After the piston 29 passes the bottom of its power stroke, the cam roller 72 in the exhaust valve cam unit 74 leaves the low dwell groove portion 78 and rides up the inclined portion 79, raising the exhaust valve tappet unit 66 and exhaust valve 43. As the piston 29 rises in its exhaust stroke, it expels the burnt gases which pass out through the exhaust passageway 45 through the exhaust manifold (not shown). When the piston 29 passes the top of its exhaust stroke and begins to descend, the roller 72 rides down the inclined groove portion 80 to the low dwell portion 78 and the exhaust valve 43 closes. This exhaust valve 43 remains closed as the cross-over 77 passes beneath the roller 72 and the latter shifts over, along the splines 71 in the sleeve 70 (Figure 6) into the low dwell groove 75 (Figure 8), continuing in this groove for a complete revolution and keeping the exhaust valve 43 closed.

Meanwhile, the high groove portion 81 of the intake valve cam unit 74 of that cylinder engages the roller 72 and raises the intake valve tappet 65 and intake valve 42 thereof and holds it open while the piston 29 descends in its intake stroke and draws in a charge of fuel gas through the intake passageway 44 from the carburetor (not shown). While the cam 72 is ascending the inclined groove portion 79, at the beginning of the intake stroke, the ridge 99 trips the lever 107 in the manner previously described, and times the spark for the cylinder which is at that instant beginning its explosion stroke, igniting its compressed charge. In this manner, the intake valve tappet 65 of each cylinder not only operates to raise and hence open its intake valve 42, but at the same time causes an ignition spark to be discharged between the spark plug electrodes in a cylinder beginning its explosion stroke.

As the engine gathers speed and the lubricating oil pressure rises, this pressure increase is transmitted through the passageway 62 (Figure 2) and ports 63 and 83 into the valve tappet chamber 97, raising the hollow piston 95 within the valve tappet unit 65. Thus, as the latter starts to rise as the cam roller 72 rides up the inclined groove portion 79, the ridge 99 reaches and trips the lever 107 at an earlier instant in the cycle than it did at low engine speed, automatically advancing the timing of the spark which is caused to jump the spark plug electrode in the cylinder to which that particular ignition device 106 is connected, as shown in Figure 9. Thus the spark timing is automatically advanced as the engine speed rises, and manual control thereof is made unnecessary.

The operating cycle of the engine in other respects follows the conventional sequence of operation as to the opening and closing of the valve during the successive intake, compression, exhaust and explosion strokes (Figure 9). The timing of the ignition is accomplished by an ignition timing device 106 connected to one of the valve tappet units 65 or 66 of each cylinder, timing the spark of another cylinder, as previously described, according to the connections thereof shown in Figure 9. It will be understood that only one ignition timing device 106 is required for each cylinder, hence one of the valve tappet units 65 or 66 in that cylinder is plain, that is, not equipped with the hollow piston 95 and ignition timing device 106 engageable thereby. As previously described, in connection with the construction thereof, the tension of the spring 98 is adjustable by loosening the set screws 91 and rotating the disc 90 by inserting a screw driver through one of the screwholes 92 from which the setscrew 91 has been temporarily removed. The set screws are then replaced and their pointed tips are caused to engage the notches or teeth 91 in the new position to which the disc 90 has been adjusted.

While the invention has been illustrated in connection with an L-head type of engine, it is obvious that it may likewise be used with a T-head engine or with an I-head (overhead valve) type of engine by an obvious rearrangement of parts. The location of the cross-over 77 in the grooveway system 73 is not critical, as the cross-over 77 may be positioned anywhere between the time the valve closes and opens. Furthermore, although the ignition timing devices 106 have been illustrated as applied to the intake valve tappet units 65, this is merely a matter of choice and the devices 106 can equally well be connected to the exhaust valve tappets 66. As previously stated, however, the ignition timing device 106 connected to one of the valve tappet units 65 or 66 of a given cylinder does not time the spark for that cylinder but rather for a different cylinder, as clearly shown in the circuit of Figure 9. As the cam roller 72 passes the cross-over 77, it turns slightly in order to do so, consequently rotating the tappet unit 65 a slight amount in the bore 58. When the cam 72 has passed beyond the cross-over 77, however, it turns back to its original direction with its plane perpendicular to the axis of the crankshaft 18, and remains in this position until it again reaches the cross-over 77, when it turns slightly in the opposite direction. Thus, the cam roller 72 crosses and recrosses the cross-over 77 every two revolutions of the crankshaft 18.

While I have shown and described my invention in detail, it is to be understood that the same is to be limited only by the appended claims, for many changes may be made without departing from the spirit and scope of my invention.

What I claim is:

1. In an internal combustion engine having a cylinder with a piston drivingly connected to a power output shaft and an ignition system and a pressure feed lubrication system connected to said cylinder, a valve controlling the opening and closing of a port in said cylinder, a rotary cam connected to said shaft, a valve operator engaging said valve, a cam follower connected to said valve operator and engaging said cam, an ignition timer in said ignition system engageable with said valve operator and responsive to the motion thereof for energizing said ignition system, and mechanism connected to said valve operator and responsive to the increase of pressure in said lubrication system for advancing the relative time of engagement between said valve operator and said timer.

2. In an internal combustion engine having a cylinder with a piston drivingly connected to a power output shaft and an ignition system and a pressure feed lubrication system connected to said cylinder, a valve controlling the opening and closing of a port in said cylinder, a rotary cam connected to said shaft, a valve operator engaging said valve, a cam follower connected to said valve operator and engaging said cam, an ignition timer in said ignition system engageable with said valve operator and responsive to the motion thereof for energizing said ignition system, a piston reciprocable in said valve operator and connected to said lubrication system, an ignition timer in said ignition system engageable with said piston and responsive to the motion thereof for energizing said ignition system, and mechanism connected to said piston and responsive to the increase of pressure in said lubrication system for advancing the relative time of engagement between said valve operator and said timer.

3. In an internal combustion engine having a cylinder with a piston drivingly connected to a power output shaft and an ignition system and a pressure feed lubrication system connected to said cylinder, a valve controlling the opening and closing of a port in said cylinder, a rotary cam connected to said shaft, a valve operator engaging said valve, a cam follower connected to said valve operator and engaging said cam, an ignition timer in said ignition system engageable with said valve operator and responsive to the motion thereof for energizing said ignition system, a piston reciprocable in said valve operator and connected to said lubrication system, a spring yieldingly engaging said piston, an ignition timer in said ignition system engageable with said piston and responsive to the motion thereof for energizing said ignition system, and mechanism conencted to said piston and responsive to the increase of pressure in said lubrication system for advancing the relative time of engagement between said valve operator and said timer.

4. In an internal combustion engine having a cylinder with a piston drivingly connected to a power output shaft and an ignition system and a pressure feed lubrication system connected to said cylinder, a valve controlling the opening and closing of a port in said cylinder, a rotary cam connected to said shaft, a valve operator engaging said valve, a cam follower connected to said valve operator and engaging said cam, an ignition timer in said ignition system engageable with said valve operator and responsive to the motion thereof for energizing said ignition system, a piston reciprocable in said valve operator and connected to said lubrication system, a spring yieldingly engaging said piston, an ignition timer in said ignition system engageable with said piston and responsive to the motion thereof for energizing said ignition system, mechanism connected to said piston and responsive to the increase of pressure in said lubrication system for advancing the relative time of engagement between said valve operator and said timer, and an adjusting device operably engaging said spring for varying the thrust thereof on said piston.

5. In an internal combustion engine having a cylinder with a piston drivingly connected to a power output shaft and an ignition system and a pressure feed lubrication system connected to said cylinder, a valve controlling the opening and closing of a port in said cylinder, a rotary cam connected to said shaft having a plurality of cam paths, a valve operator engaging said valve, a cam follower connected to said valve operator and engaging said cam paths and shiftable therebetween, an ignition timer in said ignition system engageable with said valve operator and responsive to the motion thereof for energizing said ignition system, and mechanism connected to said valve operator and responsive to the increase of pressure in said lubrication system for advancing the relative time of engagement between said valve operator and said timer.

6. In an internal combustion engine having a cylinder with a piston drivingly connected to a power output shaft and an ignition system and a pressure feed lubrication system connected to said cylinder, a valve controlling the opening and closing of a port in said cylinder, a rotary cam connected to said shaft having a plurality of cam paths, a valve operator engaging said valve, a cam follower connected to said valve operator and engaging said cam paths and shiftable therebetween, a piston reciprocable in said valve operator and connected to said lubrication system, an ignition timer in said ignition system engageable with said piston and responsive to the motion thereof for energizing said ignition system, and mechanism connected to said piston and responsive to the increase of pressure in said lubrication system for advancing the relative time of engagement between said valve operator and said timer.

7. In an internal combustion engine having a cylinder with a piston drivingly connected to a power output shaft and an ignition system and a pressure feed lubrication system connected to said cylinder, a valve controlling the opening and closing of a port in said cylinder, a rotary cam connected to said shaft having a plurality of cam paths, a valve operator engaging said valve, a cam follower connected to said valve operator and engaging said cam paths and shiftable therebetween, a piston reciprocable in said valve operator and connected to said lubrication system, a spring yieldingly engaging said piston, an ignition timer in said ignition system engageable with said piston and responsive to the motion thereof for energizing said ignition system, and mechanism connected to said piston and responsive to the increase of pressure in said lubrication system for advancing the relative time of engagement between said valve operator and said timer.

SPENCER Q. ZIMMERMAN.

REFERENCES CITED

The following references are of record in the file of this patent:

UNITED STATES PATENTS

| Number | Name | Date |
| --- | --- | --- |
| 430,505 | Barrett et al. | June 17, 1890 |
| 639,160 | Fessard | Dec. 12, 1899 |
| 1,248,597 | Baker | Dec. 4, 1917 |
| 1,708,749 | Adam | Apr. 9, 1929 |
| 1,741,090 | Adam | Dec. 24, 1929 |
| 2,215,106 | Lefebvre | Sept. 17, 1940 |
| 2,332,280 | Udale | Oct. 18, 1943 |